United States Patent [19]

Nesseth

[11] Patent Number: 5,628,912

[45] Date of Patent: May 13, 1997

[54] ROTARY SEPARATOR METHOD FOR MANURE SLURRIES

[75] Inventor: Clinton A. Nesseth, Cameron, Wis.

[73] Assignee: NTH, Inc., Barron, Wis.

[21] Appl. No.: 355,522

[22] Filed: Dec. 14, 1994

[51] Int. Cl.$^6$ ............................................. B01D 37/00
[52] U.S. Cl. ..................... 210/768; 210/772; 210/780; 210/784; 210/402; 210/403; 209/270; 209/294; 209/299
[58] Field of Search ................................. 209/268, 270, 209/294, 299; 210/784, 800, 402, 403, 404, 407, 408, 768, 772, 780

[56] References Cited

U.S. PATENT DOCUMENTS

| | | |
|---|---|---|
| 1,504,020 | 8/1924 | Brackett . |
| 1,712,258 | 5/1929 | Compain . |
| 1,920,158 | 7/1933 | Albertson . |
| 2,147,088 | 2/1939 | Carson . |
| 3,876,341 | 4/1975 | Nesseth ........................... 417/515 |
| 3,941,702 | 3/1976 | Kawada . |
| 3,971,720 | 7/1976 | Swanson et al. ................. 210/196 |
| 3,982,499 | 9/1976 | Frankl .............................. 119/16 |
| 4,426,289 | 1/1984 | Svehaug ........................... 210/403 |
| 4,439,115 | 3/1984 | Nesseth ........................... 417/460 |
| 4,477,349 | 10/1984 | Monteyne . |
| 4,518,498 | 5/1985 | Monteyne . |
| 4,623,449 | 11/1986 | Böhnensieker ................... 209/250 |
| 4,652,374 | 3/1987 | Cohen ............................. 210/603 |
| 4,666,602 | 5/1987 | Hartzell ........................... 210/298 |
| 4,724,077 | 2/1988 | Uchiyama . |
| 4,830,746 | 5/1989 | Liabenow et al. ............... 210/202 |
| 4,906,364 | 3/1990 | Luthi et al. ...................... 210/232 |
| 5,268,100 | 12/1993 | Hartzell ........................... 210/396 |

FOREIGN PATENT DOCUMENTS

| | | |
|---|---|---|
| 0383527 | 8/1990 | European Pat. Off. . |
| 688265 | 3/1953 | United Kingdom . |

OTHER PUBLICATIONS

Flyer ad for "Liquid Manure Separator for the 90's," manufactured by Mid–Atlantic AgriSystems of Oxford, Pennsylvania–1 page.

Primary Examiner—Robert J. Popovics
Attorney, Agent, or Firm—Merchant, Gould, Smith, Edell, Welter & Schmidt, P.A.

[57] ABSTRACT

A method and apparatus for efficiently separating solids from liquid/solid slurries are disclosed. The slurry to be separated is retainably placed within a container having one or more lift paddles secured within its inner cavity. The container is supported for rotation about an axis and has drive means for slowly rotating the container. As the container rotates, the lift paddles lift a portion of the retained slurry, allowing the liquid portion to fall back into the primary slurry pool to be separated, and lifting the solids toward the top of the rotation path of the paddles. The separated solids slide by gravity off of the lift paddles as they approach the top of their rotation paths and into a collection hopper and transport means that carry them away from the container. The liquids returned to the primary retained slurry within the container assist in washing the slurry for facilitating solids separation without required increase in the retained slurry volume. Continuous flow-through and multiple chamber separation containers are disclosed.

13 Claims, 6 Drawing Sheets

ROTARY SEPARATOR METHOD FOR MANURE SLURRIES

FIELD OF THE INVENTION

This invention relates generally to the separation of solids from slurries, and more particularly to a rotary separator for separating solids from animal waste slurries.

BACKGROUND OF THE INVENTION

There are many applications wherein it is desirable to separate solids from liquid/solid slurries, either for the purposes of reclaiming or recycling the separated components of the slurry, or for enabling more efficient handling or processing of the separated or "processed" components. One application, for example, is the separation of sand or particulate or granular materials from slurries of such materials. In such application, the primary purpose would be to reclaim the particulate sand from the slurry. Another application which is specifically addressed by the preferred embodiment of this specification is the removal of solids from animal waste slurries. Such processing of animal waste slurries not only allows for more efficient disposal of the removed solids, but also enables the remaining liquid and/or slurry material to be effectively and efficiently pumped for further direct use or processing.

Animal waste or manure is typically collected in a barn or other animal housing structure through slotted floors or in collection troughs or the like, and is moved either manually or by automated means toward collection reservoirs or pits. The consistency of such waste slurries includes organic solid wastes, fibrous materials such as bedding hay or the like, sand and liquids. It has been found that an optimum consistency of such waste slurries for pumping by impeller-type pumps are those that contain on the order of 5–6% solids. Such compositions can be more easily pumped and processed, with smaller, lower powered pumps and agitators. Alternatively, higher powered pumps can perform with greater efficiency. Further, it is desirable to remove as much abrasive material such as sand, and fibrous material such as hay and bedding material from the slurry prior to pumping.

In colder climates wherein the animal waste may be forced by piston pumps through underground conduits to remote storage reservoirs (as for example described in my prior U.S. Pat. Nos. 3,876,341 and 4,439,115) it is also desirable to preprocess such animal waste slurries prior to pumping by the piston pumps in order to facilitate operation of the pumps and to remove most of the fibrous material from the slurry which is a significant cause of blockage within the underground transport conduits, and which can cause the various movable valve portions of such pumping systems to hang-up or bind. Such blockages or valve malfunctions can result in costly, potentially dangerous system cleaning and/or repair operations and pressurized gas buildup in the underground lines.

One technique for simply reducing the percentage of solids in a slurry (as for example, to get down to the desired 5–6% solids figure) is to simply add water or other liquid to the slurry until the desired consistency is attained. This technique is generally unsatisfactory since it greatly increases the volume of materials requiring pumping and disposal or storage. Further, such technique does not address the problem of removal of undesirable solids such as sand or fibrous material from the slurry prior to pumping.

The best solution, therefore, is to physically remove unwanted solids from the slurry prior to pumping and/or further processing of the slurry. To date, however, known techniques for removing solids from slurries such as animal waste slurries have not been particularly efficient or flexible in use. The most commonly used such system is configured in the form of a screen-like surface engaged by a plurality of conveyor-like moving metal paddles that push the waste material along and over the screen or grid surface such as illustrated in U.S. Pat. Nos. 4,666,602 or 5,268,100. The theory of operation of such systems is that the liquid portion of the slurry will pass through the porous screen surface for collection below the screen, and the solids will be pushed along over the screen surface and collected at one end. Such apparatus is highly susceptible to wear and requires significant maintenance due to constant sliding engagement between the metal screen and conveyor blade members. Further, a portion of the solids tend to be "squeezed" through the screen by the sliding blades and back into the collected liquid portion where they have a tendency to resolidify. In addition, fibrous materials such as hay and straw have a tendency to stick or catch in the screen, causing potential binding and/or inefficiency of operation.

Others have used rotary drum-shaped screen filters for filtering solids from slurry materials. An example of such apparatus is illustrated in U.S. Pat. No. 4,426,289. The slurry is introduced to the interior of a screen-type drum filter and is pushed along the interior surface of the drum as it rotates while the liquids pass through the mesh surface of the drum. Other rotary drum filter structures, such as those used in roll press applications, pass slurry over the external surface of a rotary drum screen filter through which the liquid passes. A press roll can be used in association with the filter drum to squeeze the slurry material between the press roll and the underlying drum filter to further extract liquids from the solids. As with the conveyor-type structures, these known rotary separators use simple filtration for performing the solids separation from the slurry, but also generally require frictional engagement between the filtration screen mechanism and another structure to advance the filtered solids. Also, such filtration structures do not generally reuse the filtered liquid to assist in washing of slurry material that is yet to be separated.

A system that lifts solids from a slurry in a flow-through sewage system is shown in U.S. Pat. No. 1,920,158. Such system uses a bucket conveyor to scrape solids from a filtering screen and to lift solids from a slurry to a discharge chute. The system suffers from its use of moving conveyor parts that are inherently susceptible to failure in the raw sewage environment in which they work, and from wearing frictional engagement of the buckets with the filtration screen and collection pit from which the buckets scrape their solids.

The present invention addresses the needs and shortcomings of prior art separators and separation techniques. The present invention provides a very simple, yet effective technique for separating solids from slurries in a highly efficient and reliable manner and with apparatus that takes a minimum of physical space, and is highly reliable, uses a minimum of movable parts and which is readily adaptable for use with a large variety of slurry materials and in a number of different applications.

SUMMARY

This invention provides a simple and efficient method and apparatus for separating solids from any type of liquid/solid slurry. While the invention is particularly useful in agricultural applications for processing animal wastes, the principles of the invention apply to other applications as well, such as, for example, separating sand from liquid/sand slurries. Applicability of the principles of this invention will be limited only by the imaginations of those skilled in the art.

The invention separates solids from a slurry by rotating the slurry within a container having one or more fixed lift paddles mounted in the container and rotatable therewith. The slurry to be separated is normally retained near the bottom of the container. As the container rotates, each paddle passing through the retained slurry lifts a portion of the slurry from the bottom of the container and removes solids from the lifted slurry as the paddle rotates with the container. As the paddle traverses its rotation path as defined by the container, liquids from the lifted slurry simply flow back into the retained slurry at the bottom of the container, and the solids carried by the paddle simply slide off of the paddle and into a collection hopper as the paddle moves along the top of its rotation path. Unlike prior separation techniques that depend simply upon filtration techniques, the liquids that are separated from the lifted slurry portion flow back into the primary slurry volume being held in the bottom of the container, to further dilute the slurry and to assist in washing the slurry for enhancing separation of the solids therefrom. This is particularly advantageous in agricultural applications for the invention, wherein the slurry being separated is animal waste. Such animal waste slurries contain a sticky mucous material that has a tendency to cause the slurry to bind together and resist separation. When washed by enough liquid, the mucous material separates from the solids and enhances the separation process. The lift paddles can be fixedly secured to the inside of the container and simply rotate with the container, thereby enabling a system with no relative moving or slidable mechanical parts that are exposed to the slurry—thus providing for high reliability and low upkeep. Thus, according to one embodiment of the invention, there is provided a separator apparatus for separating solids from liquid/solid slurries, comprising:

(a) a container of a type defining an inner cavity suitable for retainably holding a predetermined volume of slurry material;

(b) support means operatively connected with the container for rotatably supporting the container for rotation about an axis;

(c) at least one lift paddle operatively connected to the container within the inner cavity and rotatable with the container along a closed arcuate path, the lift paddle being arranged and configured to engage and lift solids from the volume of slurry within the inner cavity as the container rotates about the axis in a first direction;

(d) collector means operatively extending into the inner cavity above the volume of slurry in the cavity, to at least partially underlie the lift paddle as it rotates in the first direction toward an apex of the arcuate path; and (e) drive means operatively connected with the container for rotating the container about its axis in the first direction, causing a portion of the volume of slurry to be lifted by the lift paddle such that solids from the lifted slurry fall by gravity from the lift paddle into the collector means and liquids from the lifted slurry return by gravity to the slurry volume held by the container.

The lift paddles may assume a number of varied configurations, and preferably contain a comb-like portion for enhancing a raking operation of the slurry to remove fibrous materials therefrom. Alternatively, the paddle could be constructed of screen-like material. The container could assume a variety of shapes, but is preferably of cylindrical or drum-shaped configuration and rotatable about a longitudinal axis. The container could be supported from one side only, as for example, in cantilevered manner, or could be supported from both ends in a manner such that the means supporting and rotating the container are isolated from the slurry material being processed. The principles of the invention also enable construction of a multi-stage rotatable separator wherein coarse or larger solids are removed from the initial stage, and successively finer solids are removed from successive stages. The invention is also particularly applicable to a flow-through separation container wherein slurry material to be processed is continuously introduced to one end of the separating chamber, and processed slurry and removed solids exit from the opposite end of the separation chamber.

According to yet another aspect of the invention there is provided a slurry separator, comprising:

(a) a container generally symmetrical about an axis extending through at least one end of the container, wherein the container defines an inner cavity and an access port to the inner cavity formed through the one end;

(b) a plurality of lift paddles mounted to the container and longitudinally extending in the axial direction across the inner cavity;

(c) support means operatively connected with the container for supporting the container for rotation about the axis;

(d) inlet means extending through the access port for introducing a volume of liquid/solid slurry into the inner cavity for retention by the container;

(e) outlet means operatively extending from outside the container and through the access port into the inner cavity for collecting and carrying separated solids from the container; and (f) drive means operatively connected with the container for rotating the container and lift paddles about the axis; wherein the lift paddles lift a portion of the slurry volume in the container and drop solids from the lifted slurry into the outlet means and allow liquids from the lifted slurry to return to the primary slurry volume in the container.

According to yet another aspect of the invention there is provided a method of continuously separating solids from a solid/liquid slurry, comprising the steps of:

(a) introducing and containing a volume of solid/liquid slurry into a rotatable container of the type having at least one paddle affixed to an internal wall of the container, said contained slurry forming a pool of slurry material in the container and having an upper surface;

(b) rotating the container and the paddle about an axis;

(c) causing the paddle to lift a portion of the contained slurry volume out of the slurry pool and above the upper surface thereof as the container rotates;

(d) allowing liquids from the lifted portion of the slurry to fall by gravity back into the slurry pool; and (e) dropping solids from the lifted portion of the slurry by gravity from the paddle and into a solids collector.

According to yet a further aspect of the invention there is provided a method of separating solids from a liquid/solid slurry comprising:

(a) retaining a volume of the slurry in a container;

(b) adding liquid to the retained volume in the container for washing said slurry;

(c) rotating the container about an axis;

(d) lifting a portion of the slurry from the retained volume as the container rotates;

(e) removing at least a portion of the solids from the lifted slurry; and (f) returning liquids and unremoved solids from the lifted slurry back to the slurry volume retained in the container.

According to yet a further aspect of the invention there is provided a method of progressively separating solids from a slurry in a rotatable separation container having at least first and second axially aligned separation chambers, comprising the steps of:

(a) introducing a volume of slurry to be separated into the first separation chamber;

(b) removing by rotation of the container coarse solids from the slurry, thereby creating a first processed slurry in the container;

(c) causing the first processed slurry to progress to the second separation chamber; and (d) removing by rotation of the container finer solids from the first processed slurry within the second chamber, thereby creating a twice processed slurry.

While the invention will be described in association with its application to separating animal wastes, it will be understood that the invention is not to be limited to such application. Further, while the invention will be described with respect to separation containers having defined shapes, and in particular with respect to a cylindrical drum-shaped container, that the invention is not to be limited by the particular configuration of the separation chambers described with respect to the preferred embodiments of the invention.

Further, while lift paddles of the preferred embodiments will be described with respect to particular preferred configurations and as constructed from preferred materials, the invention is not to be limited by such configurations or materials. Similarly, while the preferred embodiments of the invention will describe particular modes of supporting the separation container and with regard to particular types of rotary drive devices, such support methods and drive structures are not intended to be limiting in any way. The preferred embodiments of the invention will also describe particular transport means for removing the separated solids from the rotary container. No limitations to the invention are to be implied by such descriptions. Similarly, while the principles of multiple separating stages will be described with regard to a preferred two-stage separating chamber, the multiple separation stage principles of the invention are not to be limited in any way by such description. It will be understood that the principles of this invention can be applied to any number of separation stages. These and other aspects of the invention will become apparent to those skilled in the art upon the following more detailed description of preferred embodiments which incorporate the basic principles of this invention.

BRIEF DESCRIPTION OF THE DRAWING

Referring to the Drawing wherein like numerals represent like parts throughout the several views.

DETAILED DESCRIPTION OF THE INVENTION

Figure 1:
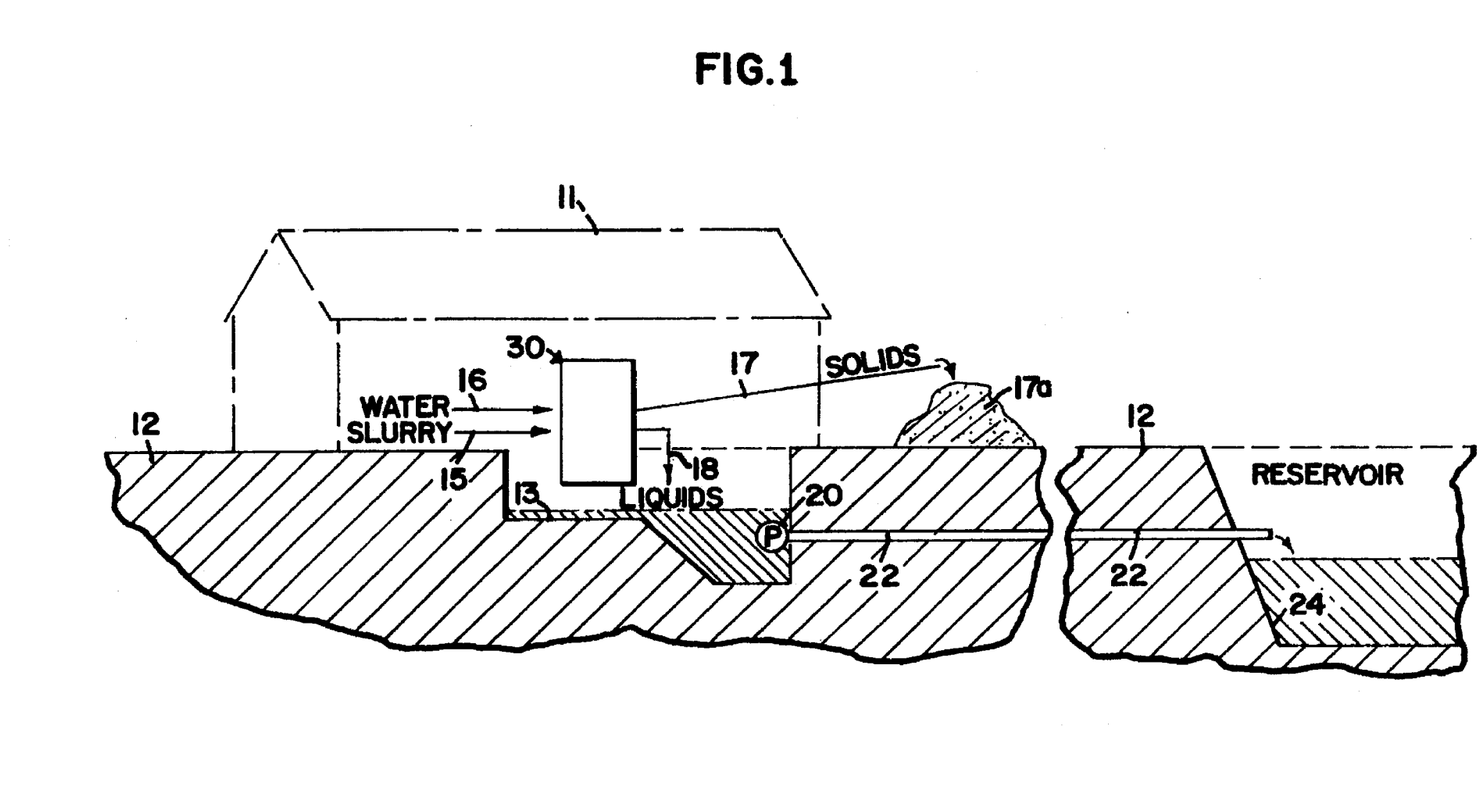
FIG. 1 is a diagrammatic view of a separator apparatus of the present invention illustrated in an environmental setting in which it might typically be used for removing solids from animal waste slurries.
Figure 2:
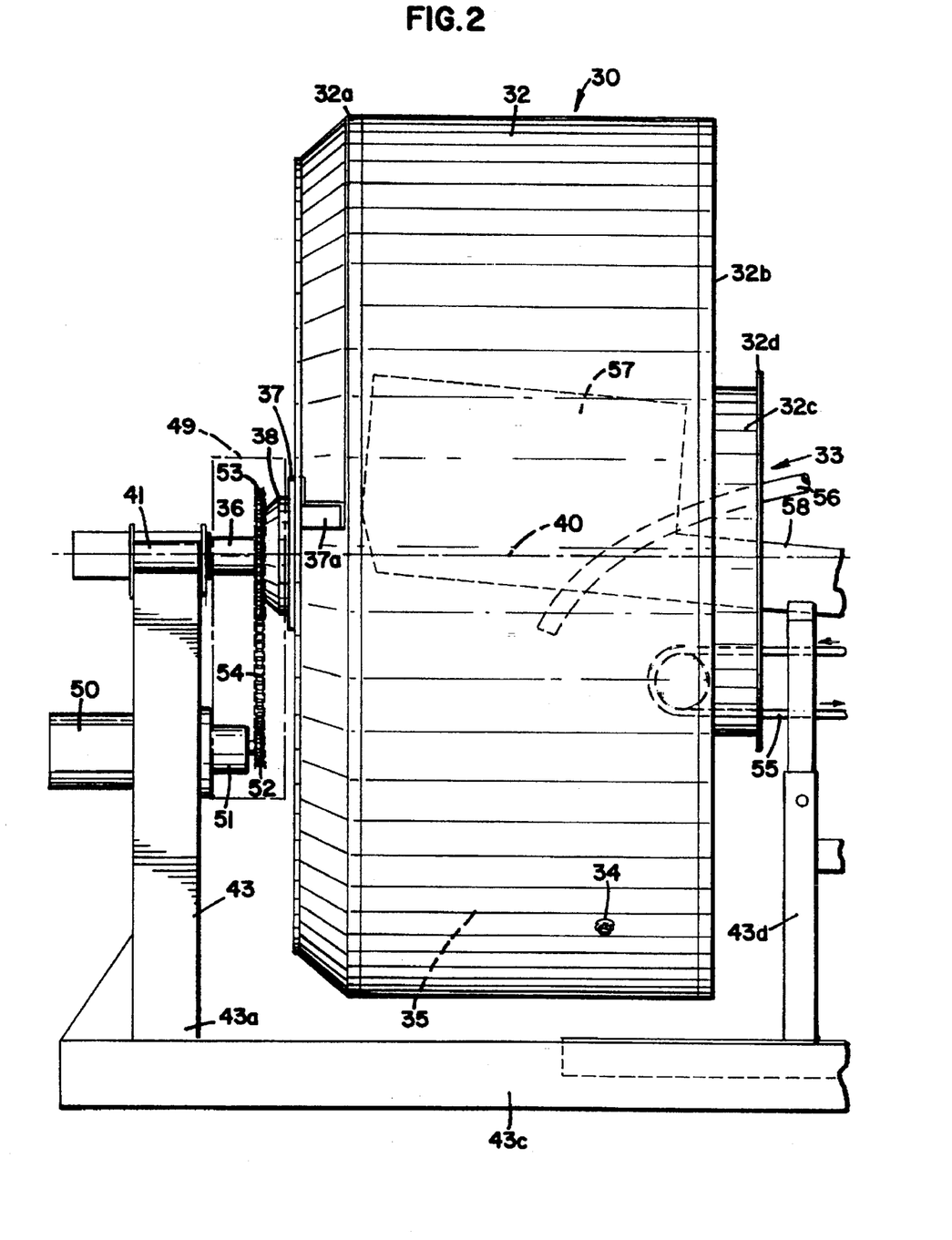
FIG. 2 is a view in side elevation of a first embodiment of the separator apparatus of FIG. 1.
Figure 3:
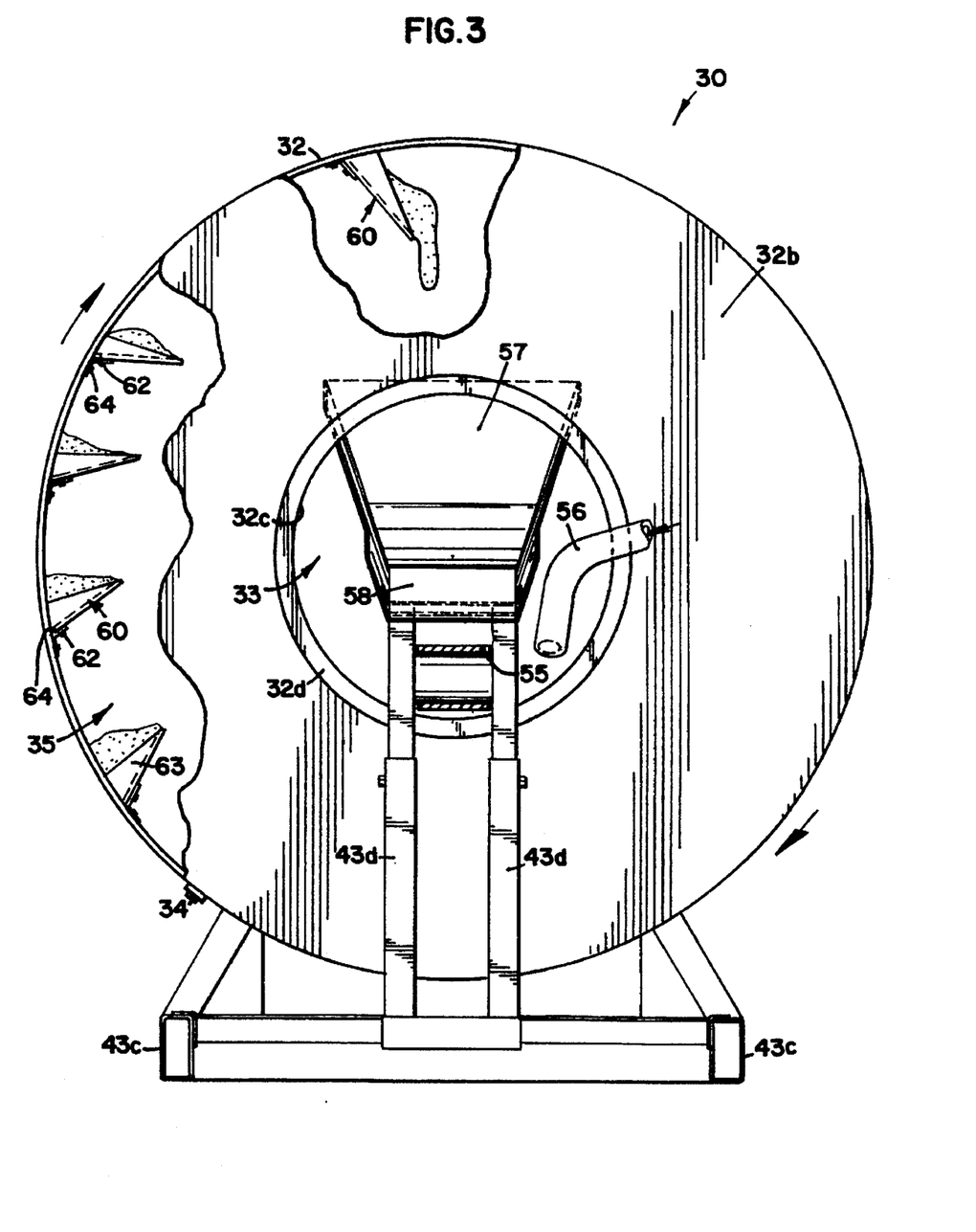
FIG. 3 is a front elevational view of the separator apparatus of FIG. 2, with portions thereof broken away.
Figure 4:
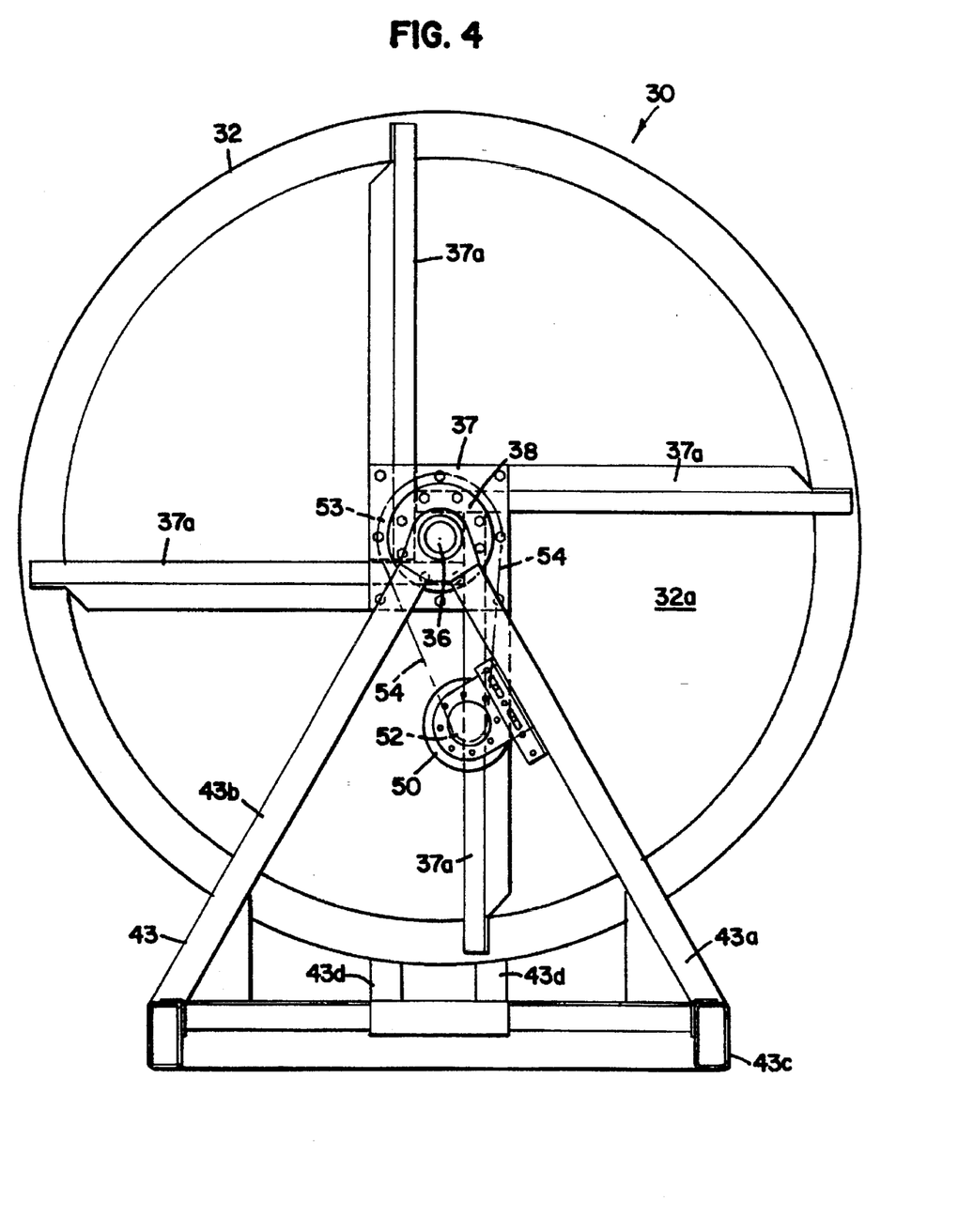
FIG. 4 is a back elevational view of the separator apparatus of FIGS. 2 and 3.

Referring to the Drawing, there is generally illustrated in FIG. 1, a diagrammatic representation of a separator apparatus 30 for separating solids from slurry materials, indicated as it might appear when used in a typical agricultural setting for separating solids from animal waste slurries. As illustrated in FIG. 1, the separator 30 is mounted within a barn 11 or other structural building 11 either above or slightly below the ground or foundation level 12 of the structure, as will be hereinafter described in more detail. The barn or structure 11 is configured to define a relatively small collection pit or reservoir 13 that is typically arranged to immediately collect and hold animal waste produced in the barn 11. Such animal waste may typically be collected throughout the barn or structure by means of a plurality of trough structures (not shown) which flow by gravity into the collection reservoir 13, or which are periodically cleaned by automated trough cleaning apparatus in a manner well-known in the art. Alternatively, the barn or structure 11 may be of the type which has slotted floor panels through which the animal waste passes and is guided toward and collected by the collection reservoir below the floor. The waste materials deposited within the collection pit or reservoir 13 typically include not only organic animal waste, but also sand and fibrous material such as straw or bedding hay, and generally have the consistency of a slurry (i.e., solids mixed with liquids).

In the environment illustrated in FIG. 1, the separator apparatus 30 of this invention is configured to intercept the generated waste materials 15 prior to deposit thereof into the building's collection pit 13. The separator apparatus 30 is also configured to receive a source of water or other liquid facilitator (generally illustrated at 16) which is used to facilitate the separation process within the separator, as hereinafter described in more detail.

The separator apparatus 30 acts to remove solids 17 from the slurry and liquid mixture deposited in the separator, which solids are transported to a solids collection pile 17a which is typically located external of the structure 11, by appropriate transport means, as hereinafter described in more detail. Excess liquids (generally designated at 18) and/or processed slurry overflows from the separator apparatus 30 and into the collection pit or reservoir 13 within the structure. The processed slurry 18 is then conveyed, typically by means of a pump 20 and an appropriate conduit, generally illustrated at 22, either above or below ground level and to a remote location. A larger storage reservoir such as indicated at 24 in FIG. 1 could be located at the remote location to collect the processed slurry and pumped liquids. Alternatively, the pumped materials could be deposited in tanker containers or the like for subsequent distribution, or could be directly deposited through appropriate spray means to a field or the like-all in manners well-known in the art. The length of conduit 22 typically extends anywhere from several hundred feet to several miles in length. The pump, diagrammatically illustrated at 20, could represent either an impeller-type pump, or a piston-type pump as, for example, illustrated in my prior U.S. Pat. Nos. 3,876,341 or 4,439,115, hereby incorporated by reference to the extent that a more complete understanding of the background of this invention is desired.

It will be understood by those skilled in the art, that the particular use application illustrated in FIG. 1 for the separator apparatus is not unique, and that such separator can be used in any situation requiring a separation of solids from a slurry containing both liquids and solids. For example, the principles of the invention would apply simply to the separation of sand from a sand/liquid slurry as well. Even in agricultural applications, the separator apparatus and principles of this invention are not limited to use situations wherein the separator overlies a collection pit or reservoir within a building or structure, but could be applied in any situation wherein it may be desirable to reduce the solids contents of a slurry as for example, prior to pumping of the slurry from a remotely located reservoir such as at 24 in FIG. 1. The primary advantage of this invention is that the separation process is performed by a simple rotary movement of a separating drum, and does not require movement of separating structures relative to one another or any relative sliding of moving parts which would be susceptible to wear, clogging, maintenance and operative failure. With the present invention, the solids separation is simply performed by lifting the solids out of a collected slurry by simple rotary motion, by allowing excess liquid to drain out of the lifted solids for reuse in washing the slurry yet to be separated, and to deposit the collected and drained solids under the simple force of gravity into a collection hopper for transport to a remote location.

A first embodiment illustrating a separating apparatus and method of this invention is illustrated in FIGS. 2 through 6. Referring thereto, the separating apparatus is generally illustrated at 30. The separator has, in the preferred embodiment, a rotatable cylindrical drum member 32 having a back side closed by a circular back plate 32a and a front side having an annular front plate 32b defining a circular inlet/outlet port 33 to the inner cavity 35 of the drum. The drum 32 is symmetrically configured for rotation about a central axis 40. The front plate 32b of the drum 32 has a forwardly extending cylindrical collar portion 32c coaxially aligned with axis 40 and terminating at an outer lip portion 32d. A spindle or axle member 36 is axially aligned with the axis 40 and is secured to a mounting bracket 37 by means of a hub assembly 38. The mounting bracket assembly 37 includes a plurality of channel iron stringer brace arms 37a which are secured to the back plate 32a and extend generally radially outward from the center of the back plate. The combination of the mounting bracket assembly 37, the hub assembly 38 and the spindle axle 36 physically support the weight of the drum 32 and its contents for rotation about the central axis 40. In the preferred embodiment, the spindle 36 is a 3-inch diameter spindle. The drum may be provided with one or more drain plugs, generally illustrated at 34.

The spindle 36 is operatively journaled for rotation within and is supported by a bearing assembly 41 carried by a pair of upper arm members 43a and 43b of a support frame 43. The upper frame members 43a and 43b are secured at their lower ends to a generally horizontally disposed lower frame assembly designated at 43c which is configured to directly lie upon and rotatably support the drum assembly on a floor or other flat support surface. In the preferred embodiment, the lower support members 43c extend from their points of securement with the upper frame members 43a and 43b, forwardly of the drum, and operatively support a plurality of generally vertically extending support members 43d which are adjustable in height (as hereinafter described) to support a conveyor or vibrating tray assembly. The support frame 43 rotatably supports the drum assembly 32 on the floor or other support surface such that the axis of rotation 40 of the drum is aligned in a generally horizontal manner. It will be appreciated that while the support frame 43 depicted with reference to the first embodiment of the invention is illustrated as supporting the rotatable drum 32 upon a flat surface, the particular configuration of such support frame is not intended to limit the invention in any way. All variations thereof are covered within the broad scope of the invention, as for example, a type of support configuration which may be used to support the rotating separator in cantilevered manner overlying a collection pit or reservoir, as for example discussed with general reference to FIG. 1.

An electric motor 50 and reducer 51 are mounted to the upper support frame member 43a. A drive chain sprocket 52 is driven by the reducer 51. A mating chain sprocket 53 is secured to the hub assembly 38 and a conventional endless roller chain 54 is entrained over the sprockets 52 and 53 to provide the drive motion for rotating the drum assembly 32 in a clockwise direction as viewed in FIG. 3. In the preferred embodiment, the electric motor is a one-half horsepower motor having a reducer that reduces the output RPM of the motor from between 10 to 20 revolutions per minute. The drive sprocket 52 is in the preferred embodiment a 3-inch sprocket and the mating hub sprocket is a 12-inch sprocket, providing an additional 4:1 reduction in speed so that the drum 32 can be adjustably rotated at an operative speed of from about 3 to 6 revolutions per minute. An appropriate chain guard assembly 49 is also provided to overlie the chain and sprocket drive assembly. In a preferred embodiment of the invention, the drum 32 has a 78-inch diameter and is approximately 30 inches wide. It will be understood, however, that the size of the drum is a matter of design choice, and can vary to meet the separation needs of the user.

A plurality of lift paddle members 60 are secured to the inner cylindrical surface of the drum 32 in uniformly spaced manner along the inner circumference of the drum. While the number of such lift paddles can vary, the preferred number is from about 16 to 20 paddles. When secured to the drum, the paddles rotate therewith, as hereinafter described in more detail.

Figures 5, 8:
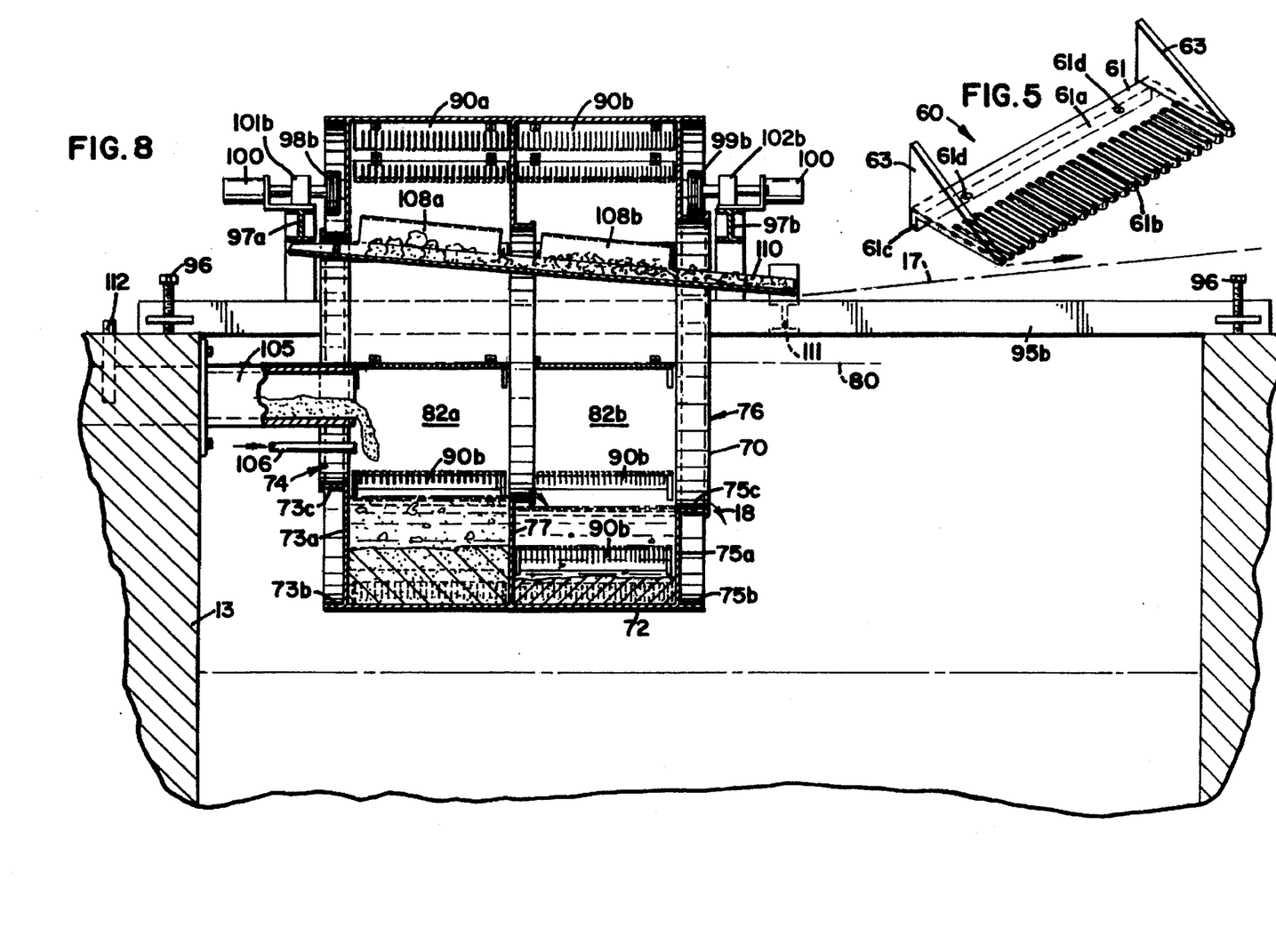
FIG. 5 is an enlarged view of a first embodiment of the lift paddle portion of the separator apparatus of FIGS. 2-4, illustrating a comb-like structure used therewith.
FIG. 8 is a cross-sectional view of the separator apparatus of FIG. 7 generally taken along the Line 8—8 of FIG. 7.

A first preferred configuration of a paddle is illustrated in FIG. 5. Referring thereto, the paddle has a comb-like base portion 61 having a generally solid rear portion 61a and a forwardly extending comb-like portion 61b.

The back edge of the rear solid portion 61a of the base 61 is angled downwardly at 61c to define a flange longitudinally extending along such back edge, for adding structural stability to the base portion along its longitudinal length. The solid portion 61a of the base 61 has a pair of mounting holes 61d formed therethrough which are aligned with holes in a plurality of "L" shaped mounting brackets 64 which are bolted or secured by welding or the like to the inner surface of the drum 32. A pair of such mounting brackets 64 are appropriately aligned and secured to the mounting drum, for mounting each of the lift paddles 60. A pair of mounting bolts 62 are entrained through the mounting holes 61d of each paddle and through the corresponding holes of the mounting bracket 64, for securing each of the lift paddles 60 to the drum 32 in removable/replaceable manner.

The opposite ends of the base portion 61 are extended upwardly in gusset-like fashion to form side walls 63, giving the lift paddle 60 a scoop-like configuration. The back edges of the side walls 63 are configured to directly engage the inner surface of the drum cavity such that the inner drum wall operatively forms a back wall of the scoop configuration. The lift paddles 60 are sized to extend in the axial direction virtually entirely across the entire width of the cylindrical drum inner cavity between the end plates 32a and 32b. In the preferred embodiment, the lift paddles 60 are secured to the drum 32 such that the forward comb-like portion 61b of the base portion 61 project inwardly and generally toward the center of the drum, but in a manner such that the general plane of the base portion 61 forms an angle of approximately 15 degrees to 20 degrees with a radian of the drum when viewed as in FIG. 3, and advanced in the rotational direction from the radian.

The slot width spacing between the comb-like fingers or tines 61b of the paddle base portion 61 can vary, to accommodate the particular use to which the separator 30 will be put. An approximate range of such spacing widths might be from 1/16 inch to 1/2 inch. Such comb-like projections might also be formed from steel rods, as for example by 3/8-inch steel rods separated by 3/8-inch spaces, or the like.

Figures 6, 7, 9:
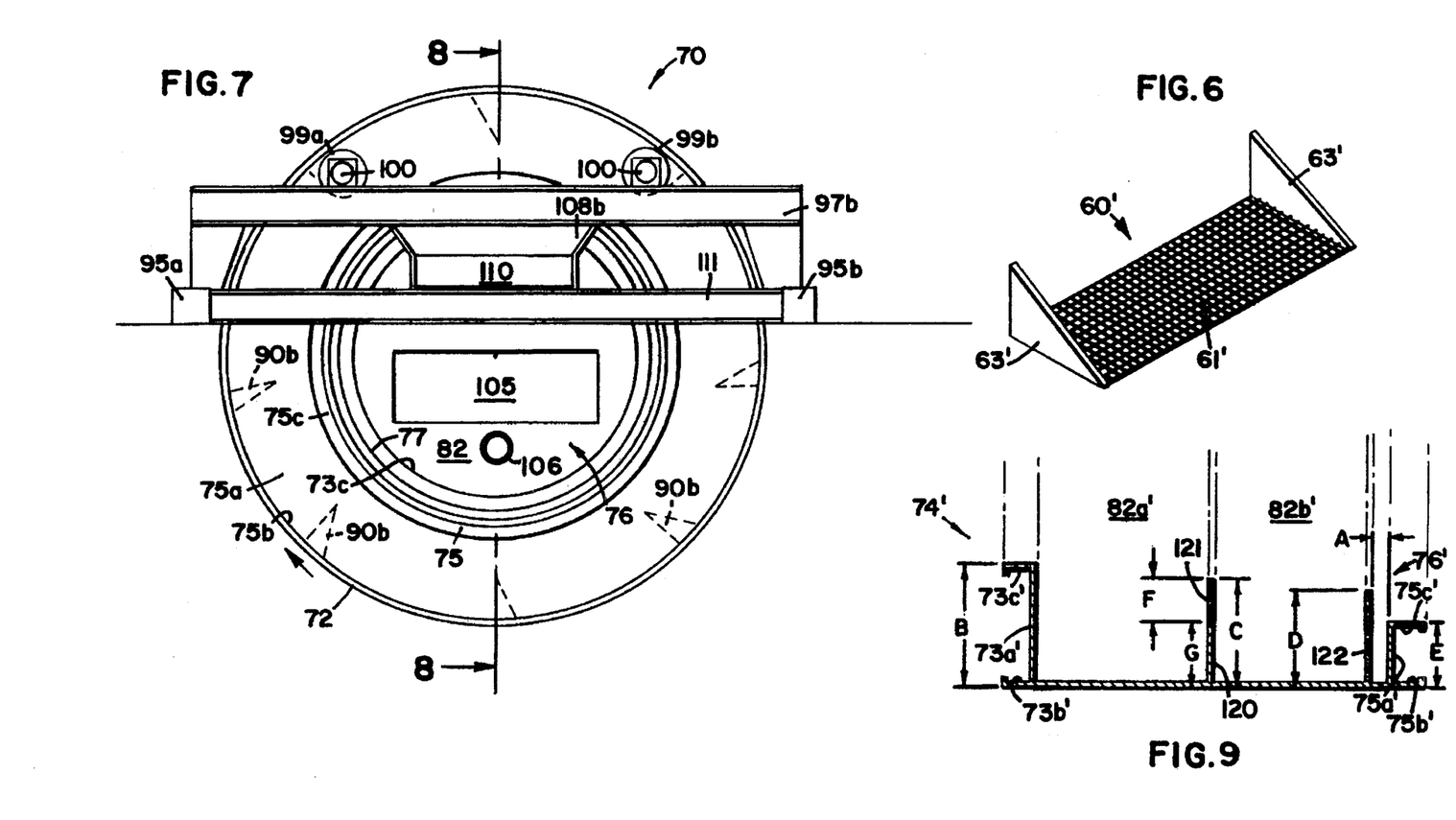
FIG. 6 is an enlarged view of a second embodiment of the lift paddle portion of the separator apparatus of FIGS. 2-4 illustrating a screen-like paddle configuration.
FIG. 7 is an end elevational view of a second embodiment of a separator apparatus of FIG. 1 as viewed from the discharge end of the separator, illustrating a continuous flow-through design with multiple separation chambers.
FIG. 9 is a partial diagrammatic cross-sectional view of the lower internal wall and divider portions of an alternate configuration thereof, for a separator of the type illustrated in FIG. 7.

The lift paddle members could be constructed using alternate configurations as for example from mesh, porous or screen-like material as illustrated at 60' in FIG. 6. It is anticipated that such mesh-like paddle would also have sidewall extensions 63' to add rigidity, but may not necessarily be required.

In the first embodiment of the separator 30 illustrated in FIGS. 2–6, the slurry material to be processed and the separated materials enter and leave the separator drum assembly respectively by means of the inlet/outlet port 33. Slurry materials are introduced into the cylindrical drum through the inlet/outlet port 33 either by means of a pipe or conduit through which slurry materials flow or are pumped, or by means of an appropriate conveyor assembly such as generally illustrated at 55. Also, a conduit 56 for introducing additional water or liquid to the drum is provided through the inlet/outlet port 33. Solids separated from the slurry by means of the rotating separator drum 32 fall by gravity into a hopper 57 which directs the solids to an appropriate transport device such as a vibrating tray or conveyor 58 which carries the solids to a remote solids depository area, or to a conveyor belt, auger or the like for transport to a remote solids depository area, as previously described with respect to FIG. 1. The hopper 57 and transport mechanism 58 are appropriately mounted to the vertical support members 43d of the support frame 43 in cantilevered manner for extension through the inlet/outlet port 33 and across the width of the drum 32, as illustrated in phantom in FIG. 2, to collect solids falling by gravity from the uppermost lift paddles 60 which are positioned in inverted manner as they rotate through the upper arcuate path of rotation defined by the cylindrical drum. The vertical support members 43d are vertically adjustable in telescopic manner to provide height adjustment to the hopper and transport mechanisms.

Since animal waste slurries include a sticky mucous-like material which tends to make the slurry stick to adjacent surfaces, it is desirable to initially precharge a sufficient amount of liquid to the inner cavity of the drum 32 by means of the water inlet 56 to assist in the "washing" of such mucous material from the slurry solids. Such washing action causes the solids to move more freely within the slurry and to separate more easily. The slurry to be separated is then introduced to the inner cavity of the drum 32 by the conveyor or input conduit 55, through the inlet/outlet port 33. A combination of slurry to be separated and water is introduced to the inner cavity 35 of the drum 32 until the combined level thereof reaches the lower border of the inlet/outlet port such that additional materials will cause liquids to spill out along and over the collar portion 32c of the drum 32 for appropriate collection by a collection pit 13 or other appropriate collection means. Thereafter, waste slurry material can be continuously added to the inner cavity 35 by means of the inlet conduit or conveyor 55 and additional water only need be added occasionally in the event that the slurry concentration gets too heavy, or if the liquid level within the cavity 35 drops below the minimum desired liquid level threshold as established by the inlet/outlet port 33.

To effect the separation process, the motor 50 is energized to cause the drum to rotate through the chain drive assembly at a rotational speed of between 3–6 RPM. As the drum 32 rotates (in the clockwise direction as viewed in FIG. 3) the lift paddles 60 scoop and lift a quantity of solids from the accumulated slurry within the cavity as the paddles traverse through the lower arc portions of their defined circular paths. As the drum continues to rotate, that slurry material retainably scooped by a paddle 60 will be lifted out of the primary reservoir of slurry material held within the cavity, thereby allowing excess liquid contained in the scooped material to flow back through the comb or porous material portions of the paddle 60 and into the underlying pool of slurry material retained within the drum cavity, for reuse in washing the remaining slurry materials in the reservoir. The retained solids are carried in arcuate manner by the lift paddles along the closed rotational path established by the rotating drum toward the top of the drum cavity, corresponding to the apex of the arcuate path traversed by the paddles. As the general plane of the base portion 61 of a paddle begins to tip beyond a "horizontal" position and inclines downwardly toward the comb edge tip thereof, excess liquids trapped by the paddle scoop configuration will first flow out of the lift paddle scoop and back into the drum cavity. As the drum continues to rotate and to further incline the base portion of the paddle at steeper angles toward its comb-like edge, the solids retainably held by the lift paddle will begin to slide under the force of gravity in the radially downward direction along the comb-like paddle surface and toward the distal end thereof, until the solids slide by gravity out of the lift paddle and into the underlying collection hopper 57. The collection hopper 57 directs the captured solids to the transport tray, conveyor, auger or other appropriate transport mechanism 58, which carry the solids to a remote solids collection site 17a. The process is continuous, as dictated by the amount of slurry added to the cavity, with the liquids within the cavity being continuously reused for washing successive quantities of introduced slurry. Excess liquids within the drum cavity 35 simply spill in overflow manner out of the inlet/outlet port 33 and back into the underlying collection pit 13 or other appropriate liquids collection means for pumping, collection or other processing. The removed solids can be further processed if desired, as for example by roll press or squeeze box structures, and spread or composted or the like.

A simple yet effective continuous washing separation process is thus performed, with no internally movable parts subject to failure or excessive wear, other than for the lift paddle blades within the rotating drum, which simply rotate with the drum. The only frictional forces applied to the lift paddles are those caused by the sliding action of the slurry and solids against the paddles as the slurry is lifted thereby, and allowed to slide by gravity therefrom.

As previously mentioned, the materials run through this type of rotary separator can be directly processed by the separator as they come from the barn or the yard. Such immediate separation will help to diminish the sand content from the materials and thus virtually eliminate the sand settling problems heretofore commonly occurring in storage pits. The separation apparatus is also usable for eliminating solids from materials that have already been stored in large storage pits or reservoirs for removing solids and fiber from such materials for facilitating pumping of the materials from the storage pits. The "combing" or "forking through" action of the lift paddle members provides positive raking action through the slurry which greatly facilitates removal of fibrous materials such as hay and straw bedding materials therefrom.

A second embodiment of a separator apparatus for separating solids from slurries, is generally illustrated at 70 in FIGS. 7 and 8 as it might appear operatively mounted in suspension overlying a reservoir or storage pit 13. The separator 70 is, as was the first embodiment, a rotary cylindrical drum structure 72 generally symmetrically disposed about a central axis 80. The cylindrical drum 72 extends between an inlet end generally designated at 73 and an oppositely disposed outlet end generally designated at 75. The inlet end 73 of the drum is partially closed by means of an annular end plate 73a that flares outwardly at its outer peripheral edge at 73b to define a support race. The annular end plate 73a also flares outwardly along its inner peripheral edge at 73c to form a collar portion that defines the inlet port 74 to the internal cavity 82 of the drum 72. The outlet end 75 of the drum 72 is partially closed by means of an annular end plate 75a that flares outwardly at its outer peripheral edge 75b to define a second support race for the drum. The annular end plate 75a also flares outwardly along its inner peripheral edge at 75c to form a collar portion that defines an outlet port 76 from the internal cavity 82 of the drum. The length of the outlet port flange 75c (as measured in the axial direction of the drum) is sized slightly longer than that of the support race 75b so that liquid 18 leaving the outlet port 76 and flowing over the outlet port flange 75c does not fall upon the support race surface 75b which might cause interference with the operation of the rotary drive support mechanism to be hereinafter described.

The cylindrical drum 72 of the second embodiment is a two-stage separator drum which has its internal cavity 82 divided along its longitudinal length by means of an annular separator or divider 77, which divides the inner cavity 82 into first and second inner cavity chambers 82a and 82b respectively. The first inner cavity chamber 82a defines the first separation stage of the dual separator chamber; and the second inner cavity chamber 82b forms the second stage of the dual separator apparatus. In the preferred embodiment, the height (in the radial direction) of the inlet end plate 73a is greater by several inches than that of the central divider 77. Similarly, the radial height of the central divider 77 is several inches greater than that of the outlet end plate 75a. Such relative height differences enable liquid flow over the central divider 77 from the first stage cavity 82a to the second stage cavity 82b, and subsequent exit overflow of liquid from the second cavity chamber 82b and over the outlet port flange 75c to the underlying collection reservoir 13.

Each of the first and second inner cavity chambers 82a and 82b respectively contains a plurality of spaced lift paddle assemblies 90 generally of the same configuration and mounting orientation as previously described with respect to the lift paddle assemblies 60 of the first embodiment. For clarity, only several of the lift paddle assemblies 90 are illustrated in FIGS. 7 and 8. Those lift paddle assemblies in the first stage of the separator (i.e., in the first inner cavity chamber 82a) are denoted by the numeral 90a, and the lift paddle assemblies mounted in the second stage of the dual separating chamber are denoted by the numeral 90b. The lift paddle assemblies 90 are connected to the inner surface of the drum 72 and operate in the same manner as previously described with respect to the lift paddle assemblies 60 of the first embodiment. It will be understood, however, that alternate mounting techniques are possible and will be readily envisioned by those skilled in the art in light of the foregoing description. In the dual-stage separator, the lift paddles 90a in the first stage of the separator operate to remove the larger and primary fibrous solids from the slurry, and are preferably configured with a relatively wider spacing between the tines of the comb-like ends of the paddle assemblies to provide enhanced "raking" action. Those lift paddle assemblies 90b within the second stage of the dual separator act to remove the finer solids from the slurry retainably held within the second inner cavity chamber 82b, and have a relatively narrower spacing between the comb-like projection tines (or a finer mesh in a screen paddle assembly configuration) of the lift paddle assemblies 90b.

The dual-stage separator drum 72 is illustrated as being rotatably suspended over a collection reservoir 13, as illustrated in FIGS. 7 and 8. It will be understood, however, that other mounting methods may be used. In the preferred embodiment of the dual-stage separator, the diameter of the drum 72 is approximately 8 feet and its axial length is approximately 6 feet, making a cylinder of such size generally impractical for mounting by one end with an axle or spindle assembly as was the case for the first embodiment single-stage separator previously described. The dual-stage cylindrical drum is, therefore, supported for rotation at both its input and output ends. A pair of longitudinally extending suspension frame beams 95a and 95b are mounted to span the open area of the storage pit 13 (as illustrated in FIG. 8), and are disposed in generally parallel manner along and to either side of the separating drum 72. The beams 95 are secured at their respective ends to the foundation walls for the storage pit 13 by means of height adjustable mounting assemblies, generally illustrated at 96, which allow for relative leveling of the suspension beams 95. A pair of cross-brace assemblies, generally indicated at 97a and 97b transversely interconnect the suspension frame beams 95a and 95b adjacent the oppositely disposed inlet and outlet ends of the drum 72 and form mounting platforms for the support drive wheel assemblies of the system.

The drum 72 is mounted for rotation upon four wheel assemblies, generally designated at 98 and 99. The pair of support wheel assemblies designated as 98a and 98b are positioned adjacent the inlet end 73 of the drum 72 and support the inlet end by means of the support race 73b of the drum. The support wheel assemblies designated at 99a and 99b are disposed adjacent the outlet end 75 of the drum 72 and support the outlet end of the drum by direct engagement with the support race 75b of the drum. The pair of support wheel assemblies 98 adjacent the inlet end of the drum are mounted for rotation to the cross-brace assembly 97a; and the pair of support wheel assemblies 99 adjacent the outlet end of the drum are operatively mounted for rotation to the cross-brace member 97b. The support wheel assemblies 98 and 99 have appropriate bearing supports for their axles as generally indicated at 101 and 102 respectively. The four point engagement of the wheels 98 and 99 with the outer support races 73b and 75b of the drum 72 provides uniform rotational support for the drum 72.

Two or more of the support wheel assemblies may be driven by hydraulic motors and appropriate coupling and reduction assemblies (generally indicated at 100 in the figures) to provide a drum rotational speed of about 3–6 RPM. The details of such drive and reduction assemblies are not illustrated in the figures, it being understood that those skilled in the art could readily configure the appropriate such drive motors and sped reduction assemblies to achieve the desired rotational drive properties. For example, the actual drive interfaces could be accomplished by means of sprockets and chains, belts, gear boxes or the like. Also, the relative sizing of the drive motors, and the reducing assemblies will depend in part upon the relative dimensions of the drive wheels 98 and 99 and the circumferences of the support races 73b and 75b. In the preferred embodiment, the drive wheel assemblies 98 and 99 have wheels with 8-inch diameters.

The suspension mounting configuration for the rotary drum enables the drum to be suspended over collection pits 13 for gravity feed situations wherein the slurry materials from a barn gutter system or the like can simply flow by gravity into the inlet port 74 of the separator drum 72. Such a connection is indicated in FIG. 8 by the conduit 105 which forms an extension of the gutter system of a barn or building, which would normally empty by gravity flow directly into the storage pit or reservoir 13. The gutter extension conduit 105 is illustrated as projecting into the inlet port 74 of the drum 72 for depositing waste slurry materials into the first stage or cavity 82a of the drum. The gravity flow gutter could have a flow control valve, generally illustrated at 112, for regulating the flow of slurry material from the gutter into the rotary separator 72. A water inlet hose, generally indicated at 106, is also provided for adding liquid to the inner cavity 82. It may also be desirable to provide an extra "flush" line (not illustrated) to the gutter in order to add extra fluid to the slurry material introduced to the drum 72, which gutter flush line could take the place of the water inlet conduit 106. Such details relate more to the adaptation of a particular facility to house a rotary separator apparatus, than to the operational characteristics or principles of operation of the separator itself. A pair of collection hoppers 108a and 108b are respectively mounted within and across the first and second cavities 82a and 82b of the separator drum 72 for directing solids deposited from the lift paddle assemblies 90a and 90b respectively onto an appropriate transport means 110, which could be a vibrating tray assembly, a conveyor or an auger, for carrying the solids out of the inner cavity of the separator and out to a remote collection area, as generally indicated by the dashed line 17 in FIG. 8. The transport means 110 is appropriately mounted for support in suspended manner through the inlet and outlet ports 74 and 76 respectively of the drum 72 as for example to the cross-brace assembly 97a at the inlet end and to one or more cross-brace assemblies such as 111 at the outlet end.

The principle of operation of the dual-stage rotary separator 72 is the same as previously described with respect to the single-stage separator, except that the solids separation operation is performed twice within the chamber 82. Solids from the slurry and water deposited within the first stage and cavity chamber 82a of the separator 72 are lifted and separated therefrom by the lifting paddle assemblies 90a as the drum rotates. The paddles 90a deposit their solids, in manner previously described, into the collection hopper 108a and the underlying transport means 110. Since the first stage of the dual-stage separator is intended to remove the coarse or larger solids from the slurry, the relative spacings of the tines of the comb portions of the lift paddles are larger in the first stage than they are for the lift paddle assemblies 90b in the second stage. As the drum 72 rotates and as additional slurry materials are deposited in the first stage from the gutter extension conduit 105, a certain amount of slurry material will flow over the central divider 77 and into the holding cavity portion of the second stage cavity 82b. The finer toothed lift paddle assemblies 90b will act upon the slurry materials within the second stage to remove finer solids therefrom in the manner previously described, and will deposit such finer solids into the collection hopper 108b and to its underlying transport means 110. That material which flows over the outlet port flange 75c of the separator drum 72 and into the underlying storage reservoir 13 will be substantially free of solids, and will have been twice-separated by the continuous separation process being performed by the rotary separator. As with the first embodiment, the lift paddle assemblies 90 could be configured of screen material, particularly in the second stage of the separator, where the finer solids are being removed from the slurry. In the first stage, it is more preferable to use the comb-like separation paddle assemblies since such paddles tend to act like forks or combs to rake through the slurry materials to engage and entrap larger solids and fibrous materials within the slurry. Also, as with the single-stage separator previously described, since the liquids from the slurries are continuously dropped back into the contained materials within the drum 72, such liquids repeatedly enhance the cleansing (washing) operation of the solids contained within the drum to continuously facilitate solids separation by the lifting paddle assemblies as they pass through the contained slurry.

The stage separation between the plural cavities of the separator need not be configured entirely out of solid materials. AN alternative arrangement of the internal stage separation configuration of a dual-stage rotary separator, similar to that illustrated in FIGS. 7 and 8, is diagrammatically portrayed in FIG. 9. Referring thereto, the input end of the drum is the same as previously described with respect to FIG. 8, wherein like parts retain like numerals in FIG. 9, but with a prime designation. The central divider 77 of FIG. 8, however, has been replaced in FIG. 9 with a lower solid portion 120 and an upper screen portion 121. The outlet end 75' is also generally the same for the FIG. 9 configuration as previously described with respect to the FIG. 8 configuration except that the relative height of the end plate 75a' is somewhat less than its previously described counterpart 75a. The FIG. 9 configuration includes an additional, second annular divider partition 122 spaced inwardly from the outlet end plate 75a by "A", which is in the preferred embodiment approximately 3 inches, and is formed entirely of a perforated or screen material. In this embodiment, the lift paddle assemblies 90a' in the first stage lie between the end plates 73a' and the composite first divider formed by the annular bands 120 and 121. The lift paddle assemblies 90b' in the second stage lie between the first composite divider 120, 121 and the second divider 122. The relative heights in the radial direction of the dividers is such that the height "B" of the inlet end plate 73a' is several inches greater than the height of the composite first divider "C" formed by 120 and 121. The relative height "C" of the composite divider 120, 121 is larger by several inches than the height "D" of the screen divider 122, which is in turn several inches greater than the height "E" of the outlet plate 75a' The height "F" of the upper screen portion 121 of the composite divider 120, 121 is approximately ⅔ that "G" of the lower solid portion 120 of the composite divider. The effect of such relative heights is that the slurry materials entering the first stage will enable liquids to flow through and over the screen portion 121 of the first divider member and into the second stage, and liquid materials can freely flow through the second screen divider 122 and out toward the outlet port 76' of the separator, but the screen 122 will retain the finer solids in the second stage cavity 82b' of the drum for continuous separating action by the rotating lift paddles 90b'. This embodiment permits liquids to flow more freely between the separation chambers, but retards the flow of solids between the chambers. However, due to the relative decreasing heights of the divider sections, when traversing from the inlet port to the outlet port of the drum 72, the general flow of materials through the separating chamber will still be from the inlet port to the outlet port thereof.

While the present invention has been described with respect to its application as illustrated in several preferred embodiments thereof, it will be understood that the number of variations of the embodiment and its applications for use in varied applications are limited only by the imagination of those skilled in the art. Further, while single- and dual-stage separators have been illustrated, those skilled in the art could readily configure separators having any number of separation stages. Also, while a cylindrical drum type of separator has been illustrated and described with respect to the preferred embodiments of the invention, the invention is not to be limited by such cylindrical shape or configuration or to the particular techniques illustrated for supporting and rotatably driving the separation chambers. These and other modifications of the invention will become apparent to those skilled in the art in light of the foregoing description. This description is intended to provide specific examples of embodiments which clearly distinguish and disclose the present invention over the known art. Accordingly, the invention is not limited to the described embodiments, or to the use of any specific components, configurations or materials described herein. All alternative modifications and variations of the present invention which fall within the broad scope of the appended claims are covered.

What is claimed is:

1. A method of continuously separating solids from a solid/liquid manure slurry, comprising the steps of:
    (a) introducing and containing a volume of solid/liquid manure slurry into a rotatable cylindrical container having solid walls and at least one porous paddle affixed to an internal wall of the container, said contained slurry forming a pool of slurry material held in the container and having an upper surface;
    (b) rotating the container and said paddle about an axis;
    (c) causing said paddle to lift a portion of the contained manure slurry volume out of said slurry pool and above said upper surface thereof as the container rotates;
    (d) allowing liquids from said lifted portion of said slurry to directly fall by gravity through and over said paddle back into said slurry pool; and
    (e) dropping solids from said lifted portion of said slurry by gravity, from said paddle and into a solids collector.

2. The method of claim 1, further including the step of continuously removing solids from said solids collector to a position external of said container.

3. The method of claim 1, further including the step of directly reusing said liquids falling by gravity from said lifted slurry and back into said slurry pool, to wash said contained manure slurry within the slurry pool to facilitate separation of solids from the slurry.

4. The method of claim 1, further including the step of raking slurry from said slurry pool onto said paddle as said paddle rotates.

5. The method of claim 1, further including the step of combing said paddle through said slurry pool as said paddle rotates through the pool.

6. The method of claim 1, further including the step of adding sufficient liquid to said slurry pool to wash said slurry for facilitating separation of solids from said slurry.

7. A method of separating solids from a liquid/solid manure slurry, comprising:
    (a) retaining a volume of said manure slurry in a container;
    (b) adding liquid to said retained volume in said container for washing said manure slurry;
    (c) rotating said container about an axis;
    (d) lifting a portion of said manure slurry from said retained volume as said container rotates;
    (e) removing at least a portion of the solids from said lifted slurry; and
    (f) returning by gravity liquids and unremoved solids from said lifted slurry directly back into said slurry volume retained in the container.

8. A method of progressively separating solids from a manure slurry in a rotatable separation container defining at least first and second axially spaced and aligned solid wall separation chambers, comprising the steps of:
    (a) introducing a volume of manure slurry to be separated into said first separation chamber;
    (b) removing by rotation of said container coarse solids from said manure slurry in said first separation chamber, thereby creating a first processed manure slurry in said container;
    (c) causing said first processed manure slurry to progress to said second separation chamber; and
    (d) removing by rotation of said container finer solids from said first processed manure slurry within said second chamber, thereby creating a twice processed manure slurry.

9. The method of claim 8, wherein said steps of removing said coarse solids and said finer solids from said manure slurry and said first processed manure slurry respectively comprise lifting solids from said manure slurry and said first processed manure slurry as said container rotates.

10. The method of claim 8, wherein the step of introducing manure slurry to said first separation chamber is continuous.

11. The method of claim 10, further including the step of continuously causing said first processed manure slurry to move to said second separation chamber as new manure slurry is added to said first separation chamber.

12. The method of claim 8, further including the step of removing said twice processed manure slurry from said container.

13. The method of claim 12, wherein the step of removing the twice processed manure slurry from the container comprises allowing said twice processed manure slurry to overflow by gravity out of said second separation chamber whenever the volume of slurry material within said second separation chamber exceeds a predetermine volume.

* * * * *